(12) United States Patent
Wilson et al.

(10) Patent No.: US 6,536,479 B2
(45) Date of Patent: Mar. 25, 2003

(54) REFRIGERANT HOSE

(75) Inventors: Reji Paul Wilson, Sun Prairie, WI (US); Brian Henry, Sun Prairie, WI (US); Pradeep Dattatraya Nadkarni, DeForest, WI (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/142,098

(22) Filed: May 9, 2002

(65) Prior Publication Data

US 2002/0189699 A1 Dec. 19, 2002

Related U.S. Application Data

(60) Provisional application No. 60/294,350, filed on May 30, 2001.

(51) Int. Cl.[7] .............................................. F16L 11/04
(52) U.S. Cl. ...................... 138/137; 138/125; 138/140; 138/DIG. 7
(58) Field of Search ................................. 138/125, 137, 138/141, 140, DIG. 7; 428/474.7, 474.9, 36

(56) References Cited

U.S. PATENT DOCUMENTS

| | | | |
|---|---|---|---|
| 4,633,912 A | 1/1987 | Pilkington et al. | 138/132 |
| 4,881,576 A * | 11/1989 | Kitami et al. | 138/125 |
| 4,950,436 A | 8/1990 | Kitami et al. | 264/103 |
| 4,996,264 A | 2/1991 | Aonuma et al. | 525/179 |
| 5,016,675 A | 5/1991 | Igarashi et al. | 138/125 |
| 5,076,329 A | 12/1991 | Brunhofer | 138/137 |
| 5,219,003 A * | 6/1993 | Kerschbaumer | 138/125 |
| 5,223,571 A | 6/1993 | Igarashi et al. | 525/58 |
| 5,362,530 A | 11/1994 | Kitami et al. | 428/36.2 |
| 5,380,571 A | 1/1995 | Ozawa et al. | 428/36.9 |
| 5,411,300 A | 5/1995 | Mitsui | 285/292 |
| 5,476,120 A * | 12/1995 | Brunnhofer | 138/103 |
| 5,706,865 A | 1/1998 | Douchet | 138/125 |
| 5,957,164 A * | 9/1999 | Campbell | 138/126 |
| 6,068,026 A | 5/2000 | Garois | 138/126 |
| 6,142,189 A | 11/2000 | Bhattacharyya | 138/177 |
| 6,230,749 B1 * | 5/2001 | Kertesz | 138/137 |
| 6,257,281 B1 * | 7/2001 | Nie et al. | 138/137 |

FOREIGN PATENT DOCUMENTS

| | | | |
|---|---|---|---|
| EP | 0470605 | 2/1992 | F16L/11/08 |
| GB | 2048427 | 12/1980 | F16L/11/06 |

* cited by examiner

Primary Examiner—Patrick Brinson
(74) Attorney, Agent, or Firm—Nancy T. Krawczyk

(57) ABSTRACT

A hose comprising a core layer, at least one reinforcement layer, and a cover layer, the core layer is comprised of inner and outer core layers, the hose being characterized by the inner core layer and the outer core layer being formed from different non-plasticized polyamides and are co-extruded at the time of formation. The hose has a permeation rate of less than 0.5 g/m/day.

11 Claims, 1 Drawing Sheet

REFRIGERANT HOSE

This application claims the benefit of Provisional application Ser. No. 60/294,350, filed May 30, 2001.

FIELD OF THE INVENTION

The disclosed invention relates to refrigerant hoses for use in automotive and industrial air conditioners.

BACKGROUND OF THE INVENTION

The automotive industry uses hoses for transporting refrigerants. The hoses generally have a three-layer laminar construction consisting of an innermost layer, an outermost cover layer located radially outwardly of the inner tube, and a reinforcing fiber layer interposed between the innermost layer and the outermost layer. Generally, the inner and outer layers are formed of rubber. The reinforcing fiber layer usually is a mesh structure formed by braided organic yarn such as polyester fiber, rayon fiber, or nylon fiber. The outer cover typically is formed of ethylene propylene diene rubber (EPDM) or chloroprene rubber (CR). Adhesion layers be may employed between the layers.

The known multi-layered rubber hoses discussed above have a high degree of flexibility. Because of this property of the rubber materials, rubber hoses can be handled with ease. However, rubber materials generally tend to have high gas permeability. Attempt to improve resistance of conventional rubber hoses to refrigerant permeation by incorporating polyamide layers such as nylon 6 or nylon 66 as an inner layer.

The nylons used for inner hose layers are conventionally plasticized polyamides. Plasticizer is added to the polyamide to improve the flexibility of the material; flexibility being a necessary characteristic of the hose. However, the addition of plasticizer decreases the permeability characteristics of the nylon; also a necessary characteristic of the hose. To achieve an acceptable compromise of the required characteristics, the thickness of the nylon inner core layer is conventionally at least 0.5 mm, see U.S. Pat. No. 4,633,912 who discloses a polyamide blend cores tube with a gauge thickness of 1.07 mm and 0.81 mm.

SUMMARY OF THE INVENTION

The present invention is directed to a hose that is particularly useful for transporting refrigerants. The hose has a high resistance to permeation and high flexibility.

The inventive hose has a selection of two different polyamides to form the inner core layer of a hose. The inner core layer is formed from co-extruded nylon layers. The inner core layer is formed from a polyamide that is nonplasticized, flexible, and has moderate resistant to refrigerant permeation. The outer core is formed from a polyamide that is nonplasticized, less flexible than the inner core polyamide, and has a higher resistant to refrigerant than the inner core polyamide. The combination of the two layers and the selective thickness of the two core layers provide the needed flexibility, heat resistance, and high resistance to refrigerant permeation.

BRIEF DESCRIPTION OF THE DRAWINGS

The invention will be described by way of example and with reference to the accompanying drawings in which.

DETAILED DESCRIPTION OF THE INVENTION

Figure 1:
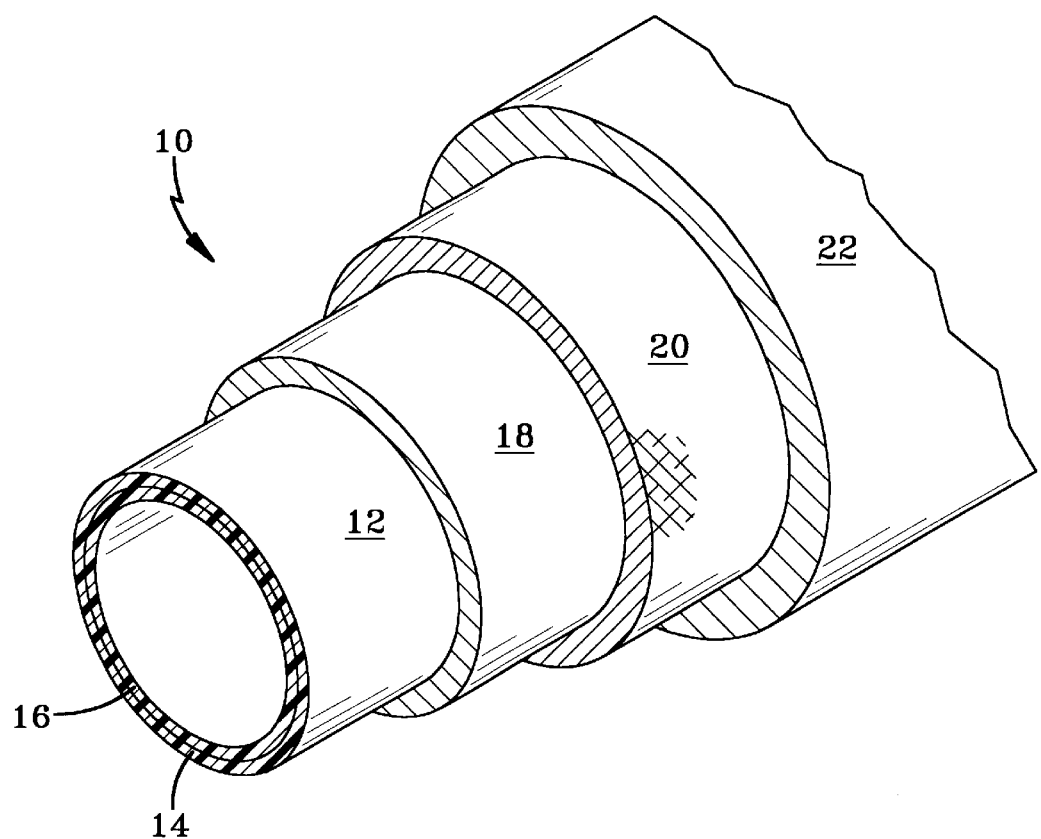
FIG. 1 is a perspective view of a hose in accordance with the present invention.

The refrigerant hose 10 of the present invention is illustrated in FIG. 1. The hose 10 has a core layer 12, relative to the radial direction of the hose and the longitudinal hose axis. The core layer 12 is formed from co-extruded layers 14, 16. Over the core layer 12 is an elastomeric friction layer 18, over which is a reinforcing layer 20, and overall, a cover layer 22.

The core layer 12, as noted, is formed from co-extruded layers 14, 16. Both co-extruded layers are non-plasticized polyamides; however, the polyamide layers 14, 16 are not formed from the same polyamide. The polyamide selected for the inner core layer 14 has the following properties: high flexibility and moderate resistance to refrigerant permeation. One exemplary polyamide is non-plasticized nylon 6. The polyamide selected for the outer core layer 16 has the following properties: moderate flexibility and high resistance to refrigerant permeability. One exemplary polyamide is non-plasticized nylon 6–66. Both polyamides selected should be compatible with known commercial refrigerant oils.

The properties of the polyamides of the inner and outer core layers are as follows:

| | Inner Core Layer | Outer Core Layer |
|---|---|---|
| Tensile Strength, Mpa | 20–40 | 60–80 |
| % Elongation at Break | 225–265 | 280-300 |
| Flex Modulus, Mpa | 500–1000 | 2,000–3,000 |
| Specific Gravity | 1.00–1.08 | 1.08–1.14 |
| Permeation Rate*, g/m/day | 1.0–2.0 | 0.1–0.5 |

*measured with R134A refrigerant, 10 days at 90° C.

To form a hose 10 that has a high degree of flexibility and permeation resistance, the gauge of the inner and outer core layers 14, 16 are optimized. The inner core layer 14 has a gauge of 0.15 mm to 0.25 mm and the outer core layer 16 has a gauge of 0.08 mm to 0.15 mm. The core layer 12 has a thickness less than the thickness of conventional nylon core layers, and the hose 10 has a comparable, if not greater, resistance to refrigerant permeation.

Layer 18 is an elastomeric friction layer between the outermost core layer 16 and the reinforcing layer 20 and provides flexibility to the hose 10. The elastomer selected for this layer should meet those characteristics. For adhesion to the adjacent polyamide layer 16, the elastomeric layer 18 may be extruded onto the core layers 14, 16. The layer may also be applied in the form of a sheet either spirally wrapped or butt seamed. These methods of applying such layers are known in the art, and variations thereof are contemplated herein.

The elastomeric friction layer 18 comprises a base polymer selected from polyisoprene, polybutadiene, copolymers of butadiene and acrylonitrile, copolymers of butadiene and styrene, polychloroprene, polybutadiene, ethylene propylene copolymers, EPDM's such as ethylene propylene norbornene terpolymers, ethylene propylene-1,4-hexadiene terpolymers, ethylene propylene dicyclopentadiene terpolymers and the like. A preferred base stock for the friction layer is EPDM.

The base polymer in the friction layer 18 must have an adhesive system and a peroxide or sulfur curative. The adhesive systems useful are the conventionally known resorcinol or phenolic based adhesive systems. The resorcinol component may be added to the elastomer in the nonproductive mix, or preformed adhesive resins may be added during the productive mix. The amount of adhesive system utilized in the elastomeric friction layer can range from 1 to 10 parts by weight based on 100 parts of base stock polymer.

The peroxide or sulfur curatives useful in the friction layer 18 are those that are normally used in such base stocks. The peroxide or sulfur curatives useful in the elastomeric friction layer are those that are normally used in such base stocks. For example peroxides such as dicumyl peroxide, [α,α'-bis (t-butylperoxide)diisopropylbenzene], benzoyl peroxide, 2,4-dichlorobenzoyl peroxide, 1,1-bis(t-butylperoxy)3,3,5-trimethylcyclohexane, 2,5-dimethyl-2,5-bis(t-butylperoxy) hexane, 2,5-dimethyl-2,5-bis(t-butylperoxy)hexyne-3, and n-butyl 4,4-bis(t-butylperoxy)valerate. From 1 to about 5 parts of peroxide or sulfur are utilized based on 100 parts of base polymer.

The reinforcing layer 20 may be a fiber layer as commonly used as a reinforcing layer for hoses. The layer 20 may be formed by braiding, spiraling, knitting, or helical knitting of yarn. The yarn may be selected from conventional hose reinforcing yarns such as glass, steel, cotton, polyester, or aramid fibers, or a blend of any of these fibers.

The cover layer 22 is selected from known cover layer materials, including but not limited to nitrile-butadiene rubber (NBR), chlorosulfonated polyethylene rubber (CSM), ethylene-propylene-diene rubber (EPDM), butyl rubber (IIR), chlorinated butyl rubber (Cl-IIR), brominated butyl rubber (Br-IIR), epichlorohydrine rubber (CHR, CHC), acrylic rubber (ACM), chloroprene rubber (CR) and the like.

As discussed above, the hose 10 having a co-extruded core 12 has a low permeation rate with refrigerants. The hose 10 has a permeation rate of less than 0.5 g/m/day, preferably 0.075 to 0.5 g/m/day. A hose with a permeation rate of less than 0.5 is considered a low permeation hose. When the permeation rate is less than 0.1, it may be considered an ultra low permeation hose.

EXAMPLE

A hose 10 was built in accordance with the present invention. The core 12 was formed by co-extruding two polyamides, having the properties as listed in Table 2. The core 12 had a gauge of 0.35 mm.

TABLE 2

|  | Inner Core Layer[1] | Outer Core Layer[2] |
|---|---|---|
| Tensile Strength, Mpa | 32 | 72 |
| % Elongation at Break | 250 | 290 |
| Flex Modulus, Mpa | 650 | 2,450 |
| Specific Gravity | 1.01 | 1.1 |
| Permeation Rate*, g/m/day | 1.6 | 0.33 |

*measured with R134A refrigerant, 10 days at 90° C.
[1]FN727, a nylon 6, sold by DuPont
[2]non-plasticized nylon 6,66 sold by Atofina The hose was tested for 10 days at 90° C. to determine the permeation rate. The permeation rate was 0.08 g/m/day, and the exemplary hose is an ultra low permeation hose.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A hose comprising a core layer, at least one reinforcement layer, and a cover layer, the core layer is comprised of inner and outer core layers formed from different non-plasticized polyamides that are co-extruded at the time of formation, the hose having a permeation rate of less than 0.5 g/m/day.

2. A hose in accordance with claim 1 wherein the inner core layer is nylon 6 and the outer core layer is nylon 6,66.

3. A hose in accordance with claim 1 wherein the polyamide forming the inner core has a tensile strength of 20–40 MPa and a permeation rate of 1.0–2.0 g/m/day and the polyamide forming the outer core layer has a tensile strength of 60–80 MPa and a permeation rate of 0.1–0.5 g/m/day.

4. A hose in accordance with claim 1 wherein the hose has a permeation rate of less than 0.5 g/m/day.

5. A hose in accordance with claim 1 wherein the hose has a permeation rate of less than 0.10 g/m/day.

6. A hose comprising a core layer, at least one reinforcing layer, and a cover layer, the core layer is comprised of an inner and outer core layer that are coextruded at the time of formation, wherein the inner core layer consists of non-plasticized nylon 6 and the outer layer consists of non-plasticized nylon 6,66.

7. A hose comprising a core layer, at least one reinforcing layer, and a cover layer, the core layer is comprised of an inner and outer core layer that are co-extruded at the time of formation, each formed of different polyamides wherein the polyamide forming the inner core has a tensile strength of 20–40 MPa and the polyamide forming the outer core layer has a tensile strength of 60–80 MPa.

8. A hose in accordance with claim 7 wherein the hose has a permeation rate of less than 0.5 g/m/day.

9. A hose in accordance with claim 1 wherein the inner layer has a thickness gauge of 0.15 to 0.25 mm and the outer layer has a thickness gauge of 0.08 to 0.15 mm.

10. A hose in accordance with claim 7 wherein the inner layer has a thickness gauge of 0.15 to 0.25 mm and the outer layer has a thickness gauge of 0.08 to 0.15 mm.

11. A hose comprising a core layer, at least one reinforcing layer, and a cover layer, the core layer is comprised of an inner and outer core layer that are co-extruded at the time of formation, each formed of different polyamides wherein the polyamide forming the inner core has a permeation rate of 1.0–2.0 g/m/day and a thickness gauge of 0.15 to 0.25 mm and the polyamide forming the outer core layer has a permeation rate 0.1–0.5 g/m/day and a thickness gauge 0.08 to 0.15 mm.

* * * * *